(12) United States Patent
Gissing et al.

(10) Patent No.: US 10,382,386 B2
(45) Date of Patent: Aug. 13, 2019

(54) FUNCTIONAL WEBPAGE TESTING TOOL

(71) Applicant: Ranorex GmbH, Graz (AT)

(72) Inventors: Michael Martin Gissing, Graz (AT); Christian Breitwieser, Graz (AT)

(73) Assignee: Ranorex Gmbh, Graz (AT)

( * ) Notice: Subject to any disclaimer, the term of this patent is extended or adjusted under 35 U.S.C. 154(b) by 190 days.

(21) Appl. No.: 15/336,544

(22) Filed: Oct. 27, 2016

(65) Prior Publication Data

US 2018/0123934 A1     May 3, 2018

(51) Int. Cl.
*G06F 15/173*     (2006.01)
*H04L 29/12*     (2006.01)
*H04L 29/08*     (2006.01)

(52) U.S. Cl.
CPC ........ *H04L 61/1511* (2013.01); *H04L 61/301* (2013.01); *H04L 67/02* (2013.01)

(58) Field of Classification Search
CPC .......................... H04L 61/1511; H04L 61/301
See application file for complete search history.

(56) References Cited

U.S. PATENT DOCUMENTS

| | | |
|---|---|---|
| 7,757,175 B2 | 7/2010 | Miller |
| 8,327,271 B2 | 12/2012 | Miller |
| 8,392,890 B2 | 3/2013 | Miller |
| 8,495,585 B2 | 7/2013 | Miller |
| 8,650,493 B2 | 2/2014 | Miller |
| 2003/0053420 A1 | 3/2003 | Duckett et al. |
| 2010/0058160 A1* | 3/2010 | Navarro ............. G06Q 10/0637 715/208 |

OTHER PUBLICATIONS

CAPBAK/Web [IE] Product Description and Resources, http://web.archive/org/web/20000229211633/http://www.soft.com/Products/Web/CAPBAK/ . . . , downloaded Mar. 9, 2015.
eValid Technology Summary, Automated Testing of Modern Web Applications, Business White Paper, eValid V9 User Manual, www.e-valid.com.
Software Research Announces CAPBAK/Web to Test Reliability of Web Sites, http://www.software-research.com/News/PressReleases/capbakweb.html, San Francisco, California, Jul. 26, 1999.
'Test an application is "test enabled"?', http://forum.evalid.org/viewtopic.php?f=2&t=32741, Feb. 5, 2013.
'What makes a browser test enabled?', http://e-valid.blogspot.com/2012/11/evalid-test-suite.html, Nov. 26, 2012.

* cited by examiner

*Primary Examiner* — Hua Fan
(74) *Attorney, Agent, or Firm* — Foley & Lardner LLP

(57) ABSTRACT

A method for facilitating testing of a webpage at a server is described. The method includes receiving a request from a user device to facilitate testing of a webpage, and loading the webpage at the server. The method further includes rewriting the source code of the webpage. The rewriting includes injecting a first code segment into the existing code of the webpage, the first code segment causing a rewriting function to be called that rewrites one or more URLs on the webpage such that a selection of a rewritten URL is redirected to the server. The rewriting further includes injecting a second code segment into the existing code of the webpage to cause a recording function to be provided on the webpage. The method further includes forwarding the webpage with the rewritten source code for presentation in a browser of the user device.

19 Claims, 12 Drawing Sheets

FUNCTIONAL WEBPAGE TESTING TOOL

BACKGROUND

A user creating or editing a webpage (or other online resource) may use a testing tool to assist in the process of developing the webpage. Testing in general is done to ensure the proper functionality of the various applications and features provided in the webpage. Such tests can be divided into functional testing, unit testing, integration testing, or manual testing. Functional tests, which are typically more time consuming than most other tests, are frequently automated in order to receive the test results immediately, which is part of agile development models. Tests may be carried out on different types of environments, such as desktop apps, websites, or mobile apps.

Some web testing tools may require a dedicated application, plugin, or other software component to be installed locally at a user device to control the actions of a browser during the test. For example, a test may be written in a particular programming language (Java, C#, etc.) and then sent to an application program interface (API) responsible for executing the code. As another example, browser plugins may be used to recognize test targets and execute tests. Another approach for testing would be redirecting the browser's network communication through a pre-configured server. For example, web traffic during the test is redirected through a proxy which modifies the web traffic. In such an approach, the browser's network settings have to be reconfigured. However, all of these approaches require a modification of the test system, which, in certain cases, can only be done by a system administrator.

Thus, in order to carry out an automated test of a webpage, an external environment adjustment is an essential step. What is needed is a system and method for recording and running functional tests of a webpage without an environmental change.

SUMMARY OF THE DISCLOSURE

One embodiment of the present disclosure relates to a method. The method includes receiving, by a server, a request from a user device in order to facilitate testing of a webpage. The method further includes loading, by the server, the webpage. The method further includes rewriting the source code of the webpage. The rewriting includes injecting, by the server, a first code segment into the existing code of the webpage, wherein the first code segment causes a rewriting function to be called, wherein the rewriting function rewrites one or more static uniform resource locators (URLs) on the webpage such that a selection of a rewritten URL is redirected to the server. The rewriting further includes injecting, by the server, a second code segment into the existing code of the webpage to cause a recording function to be provided on the webpage. The method further includes forwarding, by the server, the webpage with the rewritten source code for presentation to a browser of the user device. The method further includes recording, via the recording function, one or more user actions with one or more elements of the webpage on the user device. The method further includes starting, by the server based on input from the recording function, the playback of the one or more user actions in the browser on the user device.

In one embodiment, the at least one of the one or more user actions includes an action that causes a redirection to a new webpage. Upon the occurrence of the redirection action, a DNS wildcard host record is used to redirect the request to the server. In one embodiment, the at least one of the one or more user actions is an action that causes the loading of additional content on the webpage. Upon the occurrence of the action, a DNS wildcard host record is used to redirect the request to the server.

In one embodiment, the injection of the first code segment includes a code shimming process. The code shimming process includes intercepting a request related to a URL, wherein the request is generated by the webpage code, and modifying the URL, wherein the URL is one of in the source code of the webpage or a dynamically created URL.

In one embodiment, the injection of the first code segment includes calling a function that receives a URL and returns a variant of the URL.

In one embodiment, starting the playback of the one or more user actions in the browser on the user device includes receiving, by the server, one of a request for playback from the user device or a termination of a user action. Causing the playback further includes receiving, by the server, data relating to the one or more user actions recorded by the recording function. Causing the playback further includes repeating, by the server, the process of rewriting the source code of the webpage and forwarding, by the server, the webpage with the rewritten source code for presentation to the browser. Causing the playback further includes causing, by the server, the one or more user actions to be executed on the browser.

In one embodiment, the user actions and a URL of the webpage are saved at the server, and are accessible by a user via the user device at a later time in order to recreate the playback. In such an embodiment, the method further includes saving, by the server, at least one of metadata, values entered by a user on the webpage, URLs on the webpage at the server properties and attributes of objects, pictures, page loading or reaction timing values, object screen sizes, object sizes, item positions on the webpage, fonts, or the language of the webpage, wherein the saved information is accessible at the later time for recreating the playback.

In one embodiment, the method further includes generating, by the server, a report for the user based on the playback of the one or more user actions.

In one embodiment, the method further includes receiving, by the server, a user input relating to a scheduling of the playback at a future time. The playback occurs at the future time, wherein the server loads the webpage and causes the one or more user actions to be executed on the webpage in one of a browser on a user device or a headless bowser running at the server. One of the server or the frontend on the user device is configured to generate a report for the user based on the playback. In one embodiment, scheduling the playback at the future time includes selecting, by the server, a recurrence pattern for the playback, wherein the recurrence pattern is one of hourly, daily, weekly, monthly, yearly, or another time period. Scheduling the playback further includes selecting, by the server, a recurrence period for the playback, wherein the recurrence period specifies the cadence of the playback at the user device.

In one embodiment, recording one or more user actions includes generating, by the server via injection of a code, an interface on the browser including a plurality of controls for managing the recording of the one or more user actions. The recording further includes detecting, by the server via the injected code, a user interaction with an element of the webpage. The recording further includes storing, by the server, a user action in the interface on the browser that is descriptive of the user interaction.

In one embodiment, the method further includes receiving, by the server, a user selection from the interface, wherein the user selection is one of a request to edit a user action or delete a user action.

In one embodiment, the method includes, upon detection of a user action, identifying, by the server, one or more URLs on the webpage impacted by the user action. The method further includes using, by the server, the DNS wildcard host record to redirect the selection of the URL to the server. The method further includes rewriting, by the server, the one or more URLs such that the one or more URLs are converted to their original form. The method further includes loading, by the server, at least one element from the one or more URLs, wherein the at least one element is identified by the user action.

In one embodiment, the method further includes providing, by the server, an option on the interface for validation of an element. The method further includes triggering, by the server, the validation of an element on the webpage. The method further includes providing, by the server for display on the interface, the result of the validation of the element. In one embodiment, the validation includes one of checking if the element exists, the content of the element, the value of the element, the values of the element's attributes, or the state of the element.

In one embodiment, the one or more user actions include at least one of an individual click, a selection of a URL, a click on a link, a text input, a press of a button, a selection from a drop-down menu, a keyboard input, a mouse click, a mouse hover, a touchscreen input, a file upload, or a file download.

In one embodiment, the one or more elements on the webpage include at least one of a text field, a link, an image, a button, a scroll bar, a video, a drop-down menu, or any combination thereof.

In one embodiment, the webpage includes at least one of HTML code, JavaScript code, or ECMAScript code, wherein the one or more code segments to be injected is HTML code, JavaScript code, or ECMAScript code.

Another embodiment of the present disclosure relates to a system including at least one computing device operably coupled to at least one memory. The system is configured to receive, by the computing device, a request from a user device to facilitate testing of a webpage. The system is further configured to load, by the computing device, the webpage. The system is further configured to rewrite, by the computing device, the source code of the webpage. The rewriting includes injecting, by the computing device, a first code segment into the existing code of the webpage, wherein the first code segment causes a rewriting function to be called, wherein the rewriting function rewrites one or more static uniform resource locators (URLs) on the webpage such that a selection of a rewritten URL is redirected to the server. The rewriting further includes injecting, by the computing device, a second code segment into the existing code of the webpage to cause a recording function to be provided on the webpage. The system is further configured to forward, by the computing device, the webpage with the rewritten source code for presentation to a browser of the user device. The system is further configured to record, by the computing device, one or more user actions with one or more elements of the webpage on the user device. The system is further configured to start, by the computing device, the playback of the one or more user actions in the browser on the user device.

Yet another embodiment of the present disclosure relates to one or more computer-readable storage media having instructions stored thereon that, when executed by one or more processors, cause the one or more processors to execute operations. The operations include receiving a request from a user device to facilitate testing of a webpage. The operations further include loading the webpage. The operations further include rewriting the source code of the webpage. Rewriting includes injecting a first code segment into the existing code of the webpage, wherein the first code segment causes a rewriting function to be called, wherein the rewriting function rewrites one or more static uniform resource locators (URLs) on the webpage such that a selection of a rewritten URL is redirected to the server. Rewriting further includes injecting a second code segment into the existing code of the webpage to cause a recording function to be provided on the webpage. The operations further include forwarding the webpage with the rewritten source code for presentation to a browser of the user device. The operations further include recording one or more user actions with one or more elements of the webpage on the user device. The operations further include starting the playback of the one or more user actions in the browser on the user device.

DETAILED DESCRIPTION

Referring generally to the figures, systems and methods for providing a functional webpage testing tool are described. More particularly, systems and methods for providing the functional webpage testing tool without the need for locally installing a software component or reconfiguring a browser are described. The systems and methods described herein include the functionality of rewriting the code of a webpage using proxy functionalities in combination with DNS wildcard host records and code injection as described below.

The systems and methods described herein allow for testing of a webpage by a user without the need for locally installing a software component such as a plugin. The systems and methods herein provide a cloud-based approach to webpage testing as opposed to relying on a locally installed tool or plugin. Further, the systems and methods herein allow for presenting the webpage, during testing, without changing the appearance of the webpage to the user. The user is able to perform testing by executing one or more actions on the webpage, as the webpage would normally appear to any other user. Further, the testing can be replayed in any browser, or in the background using headless browsers (e.g., replaying the testing at a later time to ensure the webpage still works properly, or to allow a user to see the results of a testing at a later date).

Figure 1:
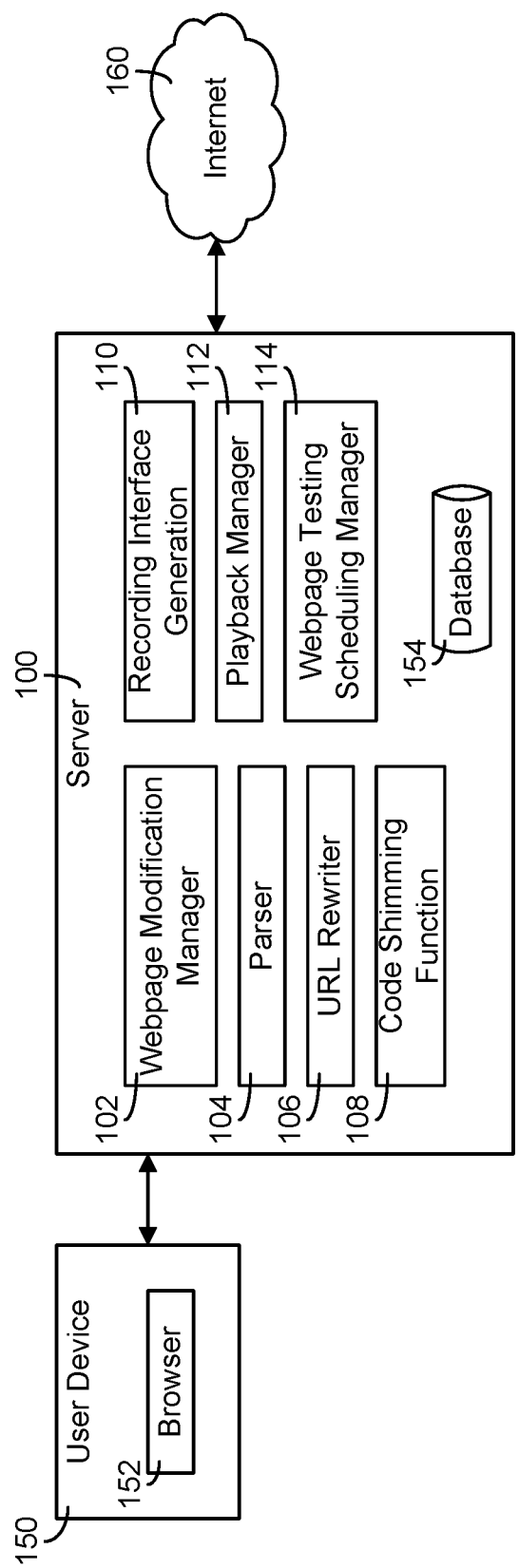
FIG. 1 is a block diagram of a server for running a functional webpage test in accordance with the systems and methods described herein according to various embodiments.

Referring to FIG. 1, a block diagram of a server 100 for running a functional webpage test is shown, according to an embodiment. The server 100 may generally receive a request from a user device 150 to facilitate testing of a webpage. A user, via the user device 150, may initiate the request, or the request may be generated automatically by a schedule as described below. The user may be a publisher of the webpage or any other user authorized to create, modify, or test the contents of the webpage. The user may wish to initiate testing of the webpage in order to ensure that the webpage is functional, that all URLs on the webpage work, that all objects are displayed or visible on the webpage, or the like. In one embodiment, the user may wish to test the webpage to see if the webpage is functioning properly on a browser application 152 of the user device 150. While the present disclosure and subsequent figures illustrate an example where a webpage on a browser is being tested, it should be understood that the systems and methods may be applicable for any type of application configured to display a webpage or webpage components on the user device 150. Further, the user device 150 may be any type of device such as a desktop computer, mobile phone, laptop, tablet, virtual machine, etc., configured to display a webpage.

The server 100 may receive the request from the user device 150 and load the webpage associated with the request (via the Internet 160). The server 100 may rewrite the source code of the webpage and forward the webpage with the rewritten source code for display on the browser 152 of the user device 150. The rewritten code causes a recording function to be displayed on the browser 152, providing testing features to the user. The user may then perform one or more user actions that are recorded and displayed on the recording function. The editing of the webpage code occurs entirely at the server 100 instead of at the browser 152 or user device 150, thereby bypassing the need to install anything at the user device 150 for the testing process.

Referring more particularly to the server 100, the activities of the server 100 during the testing process are now described in greater detail. The server 100 may generally include one or more processors and memories for executing the activities described herein. The processor may be implemented as a specific purpose processor, an application specific integrated circuit (ASIC), one or more field programmable gate arrays (FPGAs), a group of processing components, or other suitable electronic processing components. The memory may include one or more devices (e.g., RAM, ROM, flash memory, hard disk storage) for storing data and computer code for completing and facilitating the various processes described in the present disclosure. The memory may be or include volatile memory or non-volatile memory and may include database components, object code components, script components, or any other type of information structure for supporting the various activities disclosed herein.

The server 100 includes a webpage modification manager 102. After receiving a request from the user device 150 (or other indication) to test a webpage, the webpage modification manager 102 may retrieve the webpage from the Internet 160 and then initiate modification of the webpage for the testing. In one embodiment, the request from the user device includes a URL of the webpage. In other embodiments, the request may include any other type of selection that identifies the webpage to be tested. The webpage modification manager 102 loads the webpage via the Internet 160 and can work in conjunction with other modules of the server 100 to modify the webpage for testing. A parser 104 of the server 100 is configured to parse and analyze the webpage loaded at the server 100.

During configuration of the webpage for testing, all of the URLs within the webpage are rewritten. During testing, a user may select a URL on the webpage as part of the test (i.e., to test if the webpage URLs causes a correct new webpage or additional content to be loaded). When a URL is selected, instead of the browser 152 loading the new webpage or content from the Internet 160, the selection is sent to the server 100. The server 100 then loads the new webpage or content and prepares the new webpage or content for testing in the same way that the previous webpage was prepared. The server 100 is shown to include a URL rewriter 106 configured to cause the rewriting of each URL in the code of the webpage to cause a selection of a URL (e.g., the click of a link) to be redirected through the server 100.

The URL rewriter 106 may cause the rewriting of each URL based on a defined pattern, as described below. By rewriting the URLs, the URLs do not redirect to the webpage they were originally directing to, but instead to representations of the webpage that are loaded and edited on the server 100. URLs containing a path definition such as 'www.example.com/about' are adapted to, for example, 'www-example-com.test.me/about as described below. A DNS wildcard host record may be used to resolve the rewritten URLs. Using the example rewritten URL above, a DNS wildcard host record for '*test.me' may be in place to redirect the selection of the URL to the server 100 (or a preceding load balancer). Having the DNS wildcard host record in place and registered, all URLs ending with '.test.me' (or other identifiable phrase) are redirected to the server 100, which acts as a suffix-proxy. Following these principles, the webpage still appears to the same to the user and user device (i.e., the equivalent functionality, layout, app-name, and behavior of the original webpage using the same path definitions is maintained), but the server 100 loads and rewrites the webpage, allowing for continued testing of the webpages as described in the present disclosure.

One example scheme or pattern for rewriting a URL is now described. A list of all URLs on a webpage may be identified and collected by the server 100 and provided to the URL rewriter 106. A in the URL is replaced by a as a would lead to resolving a host other than a host associated with the server 100. Furthermore, a is also used as an escape sequence for a single '-' appearing in the original URL (e.g., an original URL of 'example-page.com' gets rewritten to example--page-com.test.me', with the character sequence representing the rewritten equivalent of '-'). A path can be appended to the end of the rewritten URL. For example, for a URL 'www.example.com/about', the first part is rewritten to 'www-example-com.test.me' and the '/about' is appended to the end. Queries or fragments preceding the host-specifier in a URL (e.g., '?p1=A&p2=B' or '#resource') are appended in a similar manner as a path.

In one embodiment, JavaScript code may allow for creating URLs in a dynamic manner, as shown in the code below. For example, the function 'createDynamicURL' takes a string 'ID' as an argument and creates a dynamic URL based on the ID, which is finally returned by the function. The function 'createDynamicURL' can be used elsewhere, for example by the function setupURL'. This function assigns the result of 'createDynamicURL' to the HREF attribute of an element on the webpage, allowing the created dynamic URL to be selected when the element is selected. As the URL is dynamically created, static rewriting of the URL cannot be applied. The following is an example JavaScript code for creating URLs in a dynamic manner:

```
function createDynamicURL(string ID)
{
    return 'http://page.' + ID + '.somepage.com';
}
function setupURL( )
{
    element.href = createDynamicURL ( someID );
}
```

In order to enable dynamic URL testing as described in the present disclosure, the generating code needs to be "shimmed". The server 100 is shown to include a code shimming function 108 to perform the code shimming. The code shimming is accomplished by wrapping the original code with a shimming function:

```
function SHIM(inputURL)
{
    // rewrite inputURL so it redirects to the rewriting server
}
function setupURL( )
{
    element.href = SHIM(createDynamicURL (someID));
}
```

The 'SHIM' function takes an 'inputURL' object, representative of a URL, as an argument, processes the input (i.e., rewrites the URL as described above), and returns the rewritten variant of the original URL. The function setupURL', instead of using the URL generated by the 'createDynamicURL' function, takes the additional step of calling the 'SHIM' function with the created URL, to rewrite the URL as described above.

As one example of rewriting a URL, assume that the 'createDynamicURL' function is called with a string input of '2'. The function then creates a dynamic URL for an example webpage (page.example.com in this example) of 'http://page2.example.com'. However, when the function 'setupURL' receives the dynamic URL as an input, before assigning it to a webpage element, it calls the 'SHIM' function to rewrite the URL for the subsequent testing.

The URL output by 'the setupURL' function to be associated with the element, created by the shimming function, redirects to the rewriting-proxy (e.g., the server 100). The code shimming function 108 is applied for all functions which have objects and take URLs as left hand arguments (such as 'element.href', 'element.src', or 'document.location') or any other kind of code which create redirects. In other words, the code shimming function 108 is applied for each object on a webpage with which a URL is associated. The modified webpage, after the webpage is parsed by the parser 104 and the URLs on the webpage are caused to be rewritten by URL rewriter 106 and code shimming function 108, is presented to the user device 150 and browser 152.

As the revised webpage is presented on the user device 150, recording and playback functionality is also provided on the user device 150 and browser 152 for testing purposes. The server 100 may generally include a recording interface generation module 110 for generating a user interface on the browser, the user interface presenting various features for a user during the testing of the webpage. The user interface, for example, may enable a recording mode on the browser that records the actions of a user during testing, may enable the testing of one or more particular webpage features, and may enable the playback of one or more user actions. The webpage modification manager 102 may receive the code for insertion to generate the user interface, and inject the code as part of the webpage modification.

In one embodiment, the recording interface generation module 110 generates JavaScript code (or other code) to be injected into the code of the webpage. The code generates a user interface that can be overlaid over the webpage on the browser 152. The user interface can facilitate testing by allowing the user to, for example, start and stop a recording, as described below. During a recording mode or phase, the injected code detects an event when the event occurs (e.g., any action performed by a user that impacts the webpage) and stores the user events or user actions in a background database system (shown as a database 154 in FIG. 1). A user event may be an action on an object on the webpage, such as a button, link, or other element. The background database system may or may not be local to the user device 150. In one embodiment, as shown in FIG. 1, the user actions may be temporarily locally stored and then transmitted to the server 100. Alternatively, the user actions may be stored locally, or the user actions may be transmitted to the server 100 directly.

During recording, if the user takes an action such as clicking a link, causing a redirection to another webpage, or otherwise providing an action that creates an additional request, all data is piped through the server 100. The server 100 may then fulfill the request, after modifying the new webpage or new elements through rewriting and shimming as described above.

When the user triggers the loading of another webpage through the server 100, the server 100 is responsible for inverse rewriting. In other words, if the user selects a modified URL of 'page3-example-com.test.me' on the webpage, the server 100 and more particularly the URL rewriter 106 is configured to convert the URL back to its original form (i.e., page3.example.com). The server 100 then requests the corresponding webpage via the Internet 160, and then rewrites the new webpage and presents the webpage to the user device 150 as described above. Therefore, the user device 150 and browser 152 is only in communication with the server 100 (and not the Internet) during the testing. No communication interleaving the server is done (i.e., all communication originating from the webpage under test presented in the browser on the user device 150 goes through the server 100 during the test). The rewriting and code shimming process causes all URLs to cause the user device 150 to communicate through the server 100.

In one embodiment, the user may cause a playback of one or more user actions via the user interface generated by the interface generation module 110. The playback generally replicates one or more user actions taken during a testing process that were recorded by the user interface. The server 100 is shown to include a playback manager 112 configured to facilitate the playback of the user actions on the user device 150 and browser 152.

When initiating a playback, the webpage address of the webpage to be tested is provided to the server 100. The webpage may be modified and rewritten as described above (i.e., the same process of parsing the webpage, rewriting URLs, etc.). When the webpage is fully loaded by the browser 152 and displayed, the user device 150 may then retrieve the one or more user actions to be completed on the webpage. The user device 150 may retrieve the user actions from a database 154. The database 154 is shown remotely located from user device 150; in other embodiments, the database 154 may be local to user device 150.

Once the user actions are loaded, the playback begins. The object (e.g., a button, a link, or other element on the webpage) associated with the first user action is identified, and the related action on the object is executed. For example, if the user action is a click on a button, the browser 152 causes the button to be clicked and one or more actions associated with the clicking to be executed. The browser 152 may then continue to execute all user actions retrieved, one by one, until all user actions are executed on the webpage(s). During playback, a user interface or other output may be generated and displayed on the user device 150, indicating a success or failure of a particular user action, along with any other information relevant to the user.

If a user action relates to, for example, clicking on a link, the playback may require the loading of a new webpage. In such a case, as before, the server 100 receives the indication, as the URL has been rewritten to redirect to the server 100 instead of directly to the webpage. The server 100 retrieves and rewrites the webpage as described above, and provides the modified webpage to the user device 150 for the playback. Various other features that may be provided during the recording and playback process will be described below with regards to FIGS. 4-10.

In one embodiment, a user may be able to schedule a test or playback for a webpage. For example, the user may wish to initiate a playback on a webpage at a particular date or time, may want to test the webpage once every week, month, etc., or may want to test the webpage a set number of times in a given timeframe (e.g., ten times an hour). In such a case, a user may be able to schedule a playback. The server 100 may include a webpage testing scheduling manager 114. The manager 114 may generally store data from a user that indicates the webpage to be tested, one or more user actions to be simulated during the test, and one or more times at which to execute the playback. The playback may be executed at the server 100 or executed at the user device 150, in various embodiments. Scheduling features provided by the server 100 are described in greater detail in FIG. 11.

It should be noted that while the selection of a link may be a common trigger for causing the server 100 to retrieve a webpage (or new content for the webpage), rewrite the webpage, and provide the webpage in response; it should be understood that other redirecting activity may be performed by a user on the browser that may cause the server 100 to retrieve, rewrite, and provide the new webpage. The present disclosure describes the selection of a link as a common method of causing the need for a new webpage; however that example is not limiting and any redirecting activity (e.g., a click on a button, selecting a radio button, typing text in a text field, etc.) may cause the process of retrieving, rewriting, and providing the new webpage to begin.

It should also be noted that the server 100, in various embodiments, can retrieve an entire webpage or simply new content to be displayed in the webpage upon receiving the trigger. For example, a webpage may generally be configured to load new content on a webpage upon receiving a user input (e.g., search terms). The systems and methods herein may be implemented for both scenarios in which an entire webpage is retrieved and only new content to be displayed on the webpage is received.

Figure 2:
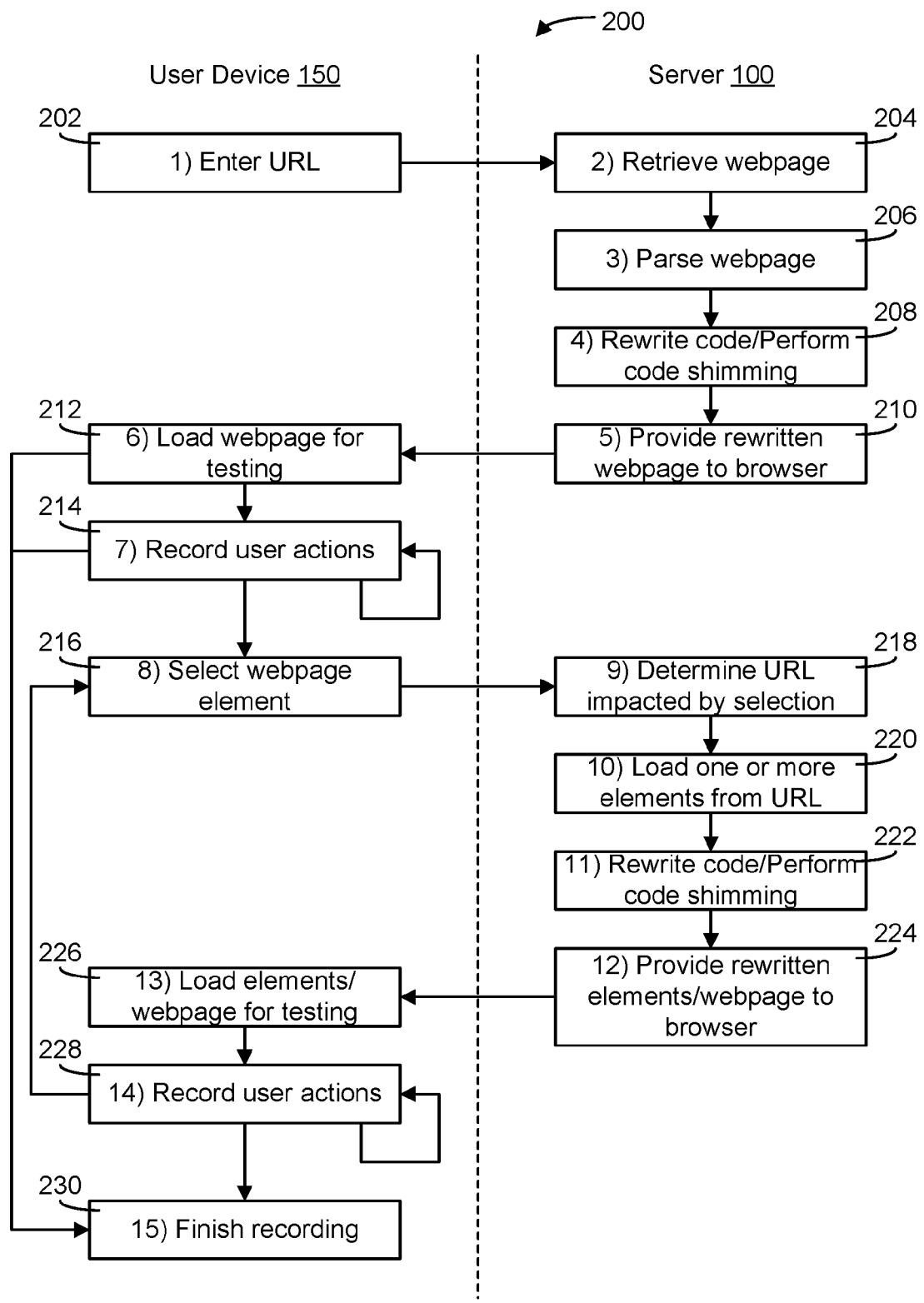
FIG. 2 is a flow chart illustrating a web testing process wherein user actions are recorded according to various embodiments.

Referring now to FIG. 2, a flow chart illustrating a web testing process 200 is shown according to various embodiments. More particularly, FIG. 2 illustrates the interactions between a user device 150 and the server 100 during the testing of a webpage. At the user device 150, the user enters the URL of the webpage to be tested (block 202). The request for the webpage is sent to the server 100, instead of the user device 150 retrieving the webpage from the Internet itself.

The server 100 then goes through the steps of retrieving the webpage from the Internet (block 204), parsing the webpage (block 206), and then rewriting the code of the webpage (block 208). Block 208 further includes any webpage code modification, such as the code shimming process as described above. At block 208, the server 100 inserts code into the code of the webpage that causes a shimming function to be called when a URL is associated with an element on the webpage. For example, as described above, a function in the code (e.g., 'setupURL') is modified such that the shimming function is called for a URL as the URL is being assigned as a HREF attribute of an element. Therefore, when the webpage is eventually loaded on the user device 150, the shimming function in the injected code causes each URL on the webpage to be rewritten. The rewriting of the webpage code includes the insertion of code that causes a recording user interface to be generated on the webpage.

The rewritten webpage is provided to the user device (block 210) and loaded at the user device 150 (block 212). The user may initiate a recording via the recording user interface, configured to record user actions on the webpage during the testing. Once the testing begins, user actions are recorded on the webpage (block 214). User actions may generally include, for example, typing in a text field, clicking a button, moving a mouse or other pointer, scrolling, etc.

Some user actions may include an interaction with a webpage element. Some interactions with webpage elements may cause the user device 150 to need to retrieve information via the Internet to complete the action. For example, a click on a search button on a search webpage may generally cause search results to be retrieved. As other examples, a user may click on a video or audio clip to cause video and/or audio to be played back on the webpage; typing in a text field may cause a list of suggestions to be retrieved and displayed below the text field; a click on a link may cause another webpage to be retrieved, and the like. For such user actions, where a webpage, webpage elements, or other information needs to be retrieved from the Internet, the request for the information is provided to the server 100, instead of the user device 150 retrieving the information itself. The use of a DNS wildcard host record may be used to identify that the request for the information should go through the server 100. The user device 150 determines when such a webpage element is selected (block 216) and sends the request to the server 100.

The server 100 determines a URL identified or impacted in the selection of the webpage element (block 218). For example, block 218 may simply include identifying that a user clicked on a link, and converting the URL to allow the server 100 to retrieve the webpage. Block 218 may also include, depending on the user action and the webpage element, identifying any type of information to be retrieved by the server 100, and from where to retrieve the information. The server 100 loads the one or more elements from the URL (block 220), which, as described above, may include an entire webpage, one or more documents, one or more webpage elements, data, or any combination thereof.

The server 100 then rewrites code and performs code shimming for the retrieved elements (block 222). If the server 100 retrieved an entire webpage, then the entire webpage may be rewritten just like the previous webpage. If the server 100 retrieved any other information, the modification of the elements may vary based on the type of element. In general, the server 100 may rewrite the code for the elements such that any further requests for information caused by an interaction with the element calls the server 100 instead of the Internet. The server 100 provides the rewritten elements and/or webpage to the user device 150 (block 224), which are loaded at the user device (block 226).

User actions continue to be recorded (block 228), and the process may be repeated as further webpage elements are selected, until the recording is finished by the user (block 230).

Figure 3:
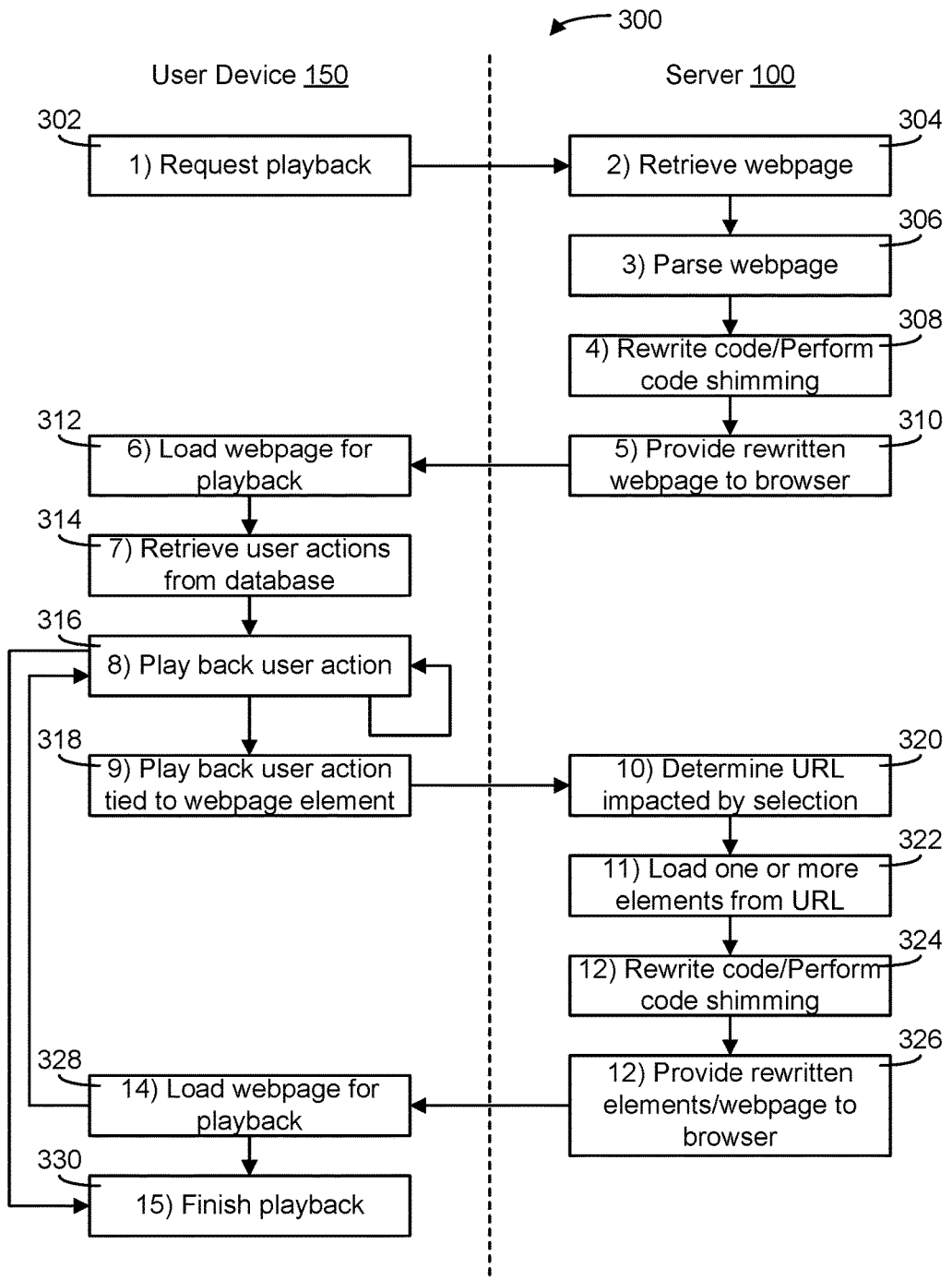
FIG. 3 is a flow chart illustrating a web testing process wherein one or more user actions are played back on a browser of a user device of the user according to various embodiments.

Referring now to FIG. 3, a flow chart illustrating a web testing process 300 is shown according to various embodiments. More particularly, FIG. 3 illustrates the interactions between a user device 150 and the server 100 during a playback on the browser of the user device 150. The interaction between the user device 150 and server 100 in the process 300 may be similar to that of the other web testing process 300, with the notable exception that the user actions to be executed are already specified. In other words, while a playback is initiated by a user, the playback including known user actions, the server 100 operates in the same general manner with respect to preparing the webpage for the testing.

At the user device 150, the user requests the playback (block 302). The request may generally include the webpage to be tested and any other information that allows the user device 150 and/or server 100 to identify the user actions to be simulated on the webpage. The user device 150 provides the webpage to the server 100. The server 100 then goes through the steps of retrieving the webpage from the Internet (block 304), parsing the webpage (block 306), rewriting the code of the webpage (block 308), and providing the rewritten webpage to the user device 150 (block 310).

The user device 150 and browser loads the webpage for the playback (block 312) and retrieves the user actions to be executed on the webpage (block 314). The user actions are retrieved from either a remote database (e.g., a database at the server 100) or a database local to the user device 150. One by one, the user actions are played back on the user device 150 (block 316). The playback of the user actions may occur on a browser of the user device 150. In one embodiment, the playback of the user actions may occur on a headless browser (e.g., a bowser without a graphical user interface, which executes actions via a command line interface or via network communications. The playback of each user action generally includes identifying the element involved in the user action and the type of action performed (e.g., a click, typing, etc.), and executing the user action.

Some user actions may be tied to an interaction with a webpage element. Some interactions with webpage elements may cause the user device 150 to retrieve information (e.g., another webpage, webpage elements, documents, data, etc.) via the Internet to complete the action. For such user actions, the request for the information is provided to the server 100, instead of the user device 150 retrieving the information itself. The use of a DNS wildcard host record may be used to identify that the request for the information should go through the server 100. The user device 150 determines when such a webpage element is selected during the playback (block 318) and sends the request to the server 100.

The server 100 determines a URL identified or impacted in the selection of the webpage element (block 320) and loads the one or more elements from the URL (block 322), which, as described above, may include an entire webpage, one or more documents, one or more webpage elements, data, or any combination thereof. The server 100 then rewrites code and performs code shimming for the retrieved elements (block 324). The server 100 provides the rewritten elements and/or webpage to the user device 150 (block 326), which are loaded at the user device (block 328). This process is completed until the playback is finished (i.e., all user actions in the playback have been completed) (block 330).

Referring generally to FIGS. 4-11, various example user interfaces are illustrated. The user interfaces of FIGS. 4-11 illustrate various testing and playback features of the present disclosure. The user interfaces of FIGS. 4-11 may be presented to a user on a user device 150 via a browser 152.

Figure 4:
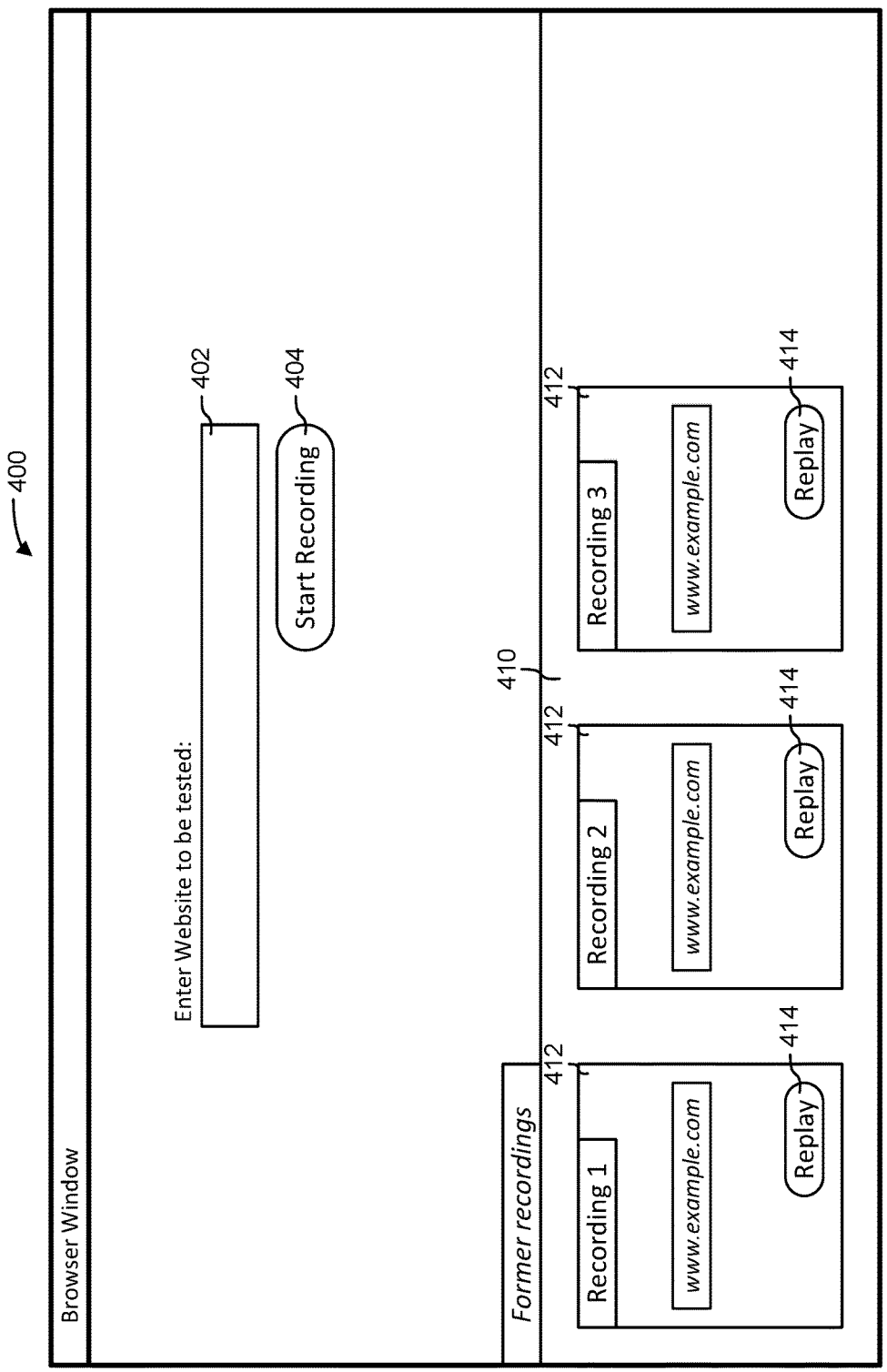
FIG. 4 is an example user interface, wherein the user interface is a start page or setup page for beginning a webpage test according to various embodiments.

The user interface 400 of FIG. 4 illustrates a start page where a user may initiate a test or playback according to various embodiments. In one embodiment, the user may visit a webpage associated with the server 100 and initiate a test or playback from the webpage. In other embodiments, the user may initiate the test or playback from any other application and cause the test or playback to be launched in a new browser window, or may initiate the test or playback in any other way.

In one embodiment, the user may simply enter the webpage to be tested in the text field 402, and click the start recording button 404 to initiate the test. In other embodiments, the user may select the webpage to be tested in any other way (e.g., via some type of menu selection, selection of one or more buttons, etc.). The specified webpage is sent to the server 100 to initiate the testing.

Instead of starting a new test, the user may choose a former recording to play back. The user interface 400 includes a former recordings section 410 from which the user can select from one or more previously saved recordings 412. Each recording includes a webpage (e.g., 'www.example.com') and one or more user actions. The user interface 400 may display the webpage and any other identifying information for the user, and the user may select to play back a recording by clicking on the replay button 414. The recording information may be stored either locally at the user device 150 and retrieved and displayed on the user interface 400 when the webpage is loaded in the browser, or stored elsewhere at a server in a network environment.

Figure 5:
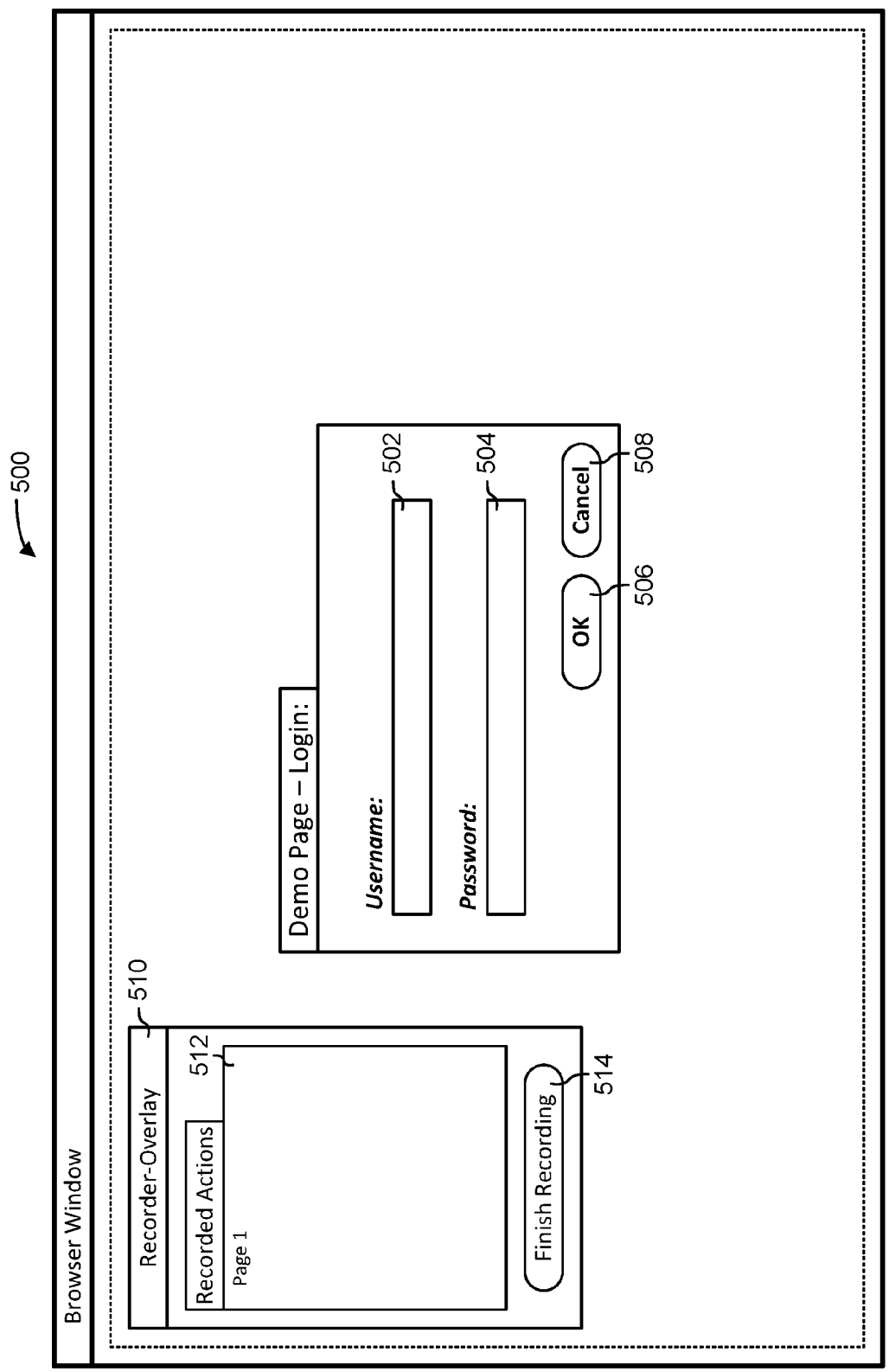
FIG. 5 is an example user interface, wherein a recording function is presented in the browser window to record user actions during the webpage test according to various embodiments.

At the user interface 500 of FIG. 5, the user has selected to initiate a new test. In the example of FIG. 5, the example webpage is loaded and includes a login prompt including two text fields for a username 502 and password 504 and two buttons 506, 508. The webpage presented in the user interface 500 has been rewritten by the server 100, and provided from the server 100 to the user device 150, as described above. However, as noted above, the functionality and appearance of the webpage is the same as if the webpage had been loaded directly from the Internet instead of server 100. The actions of server 100 to rewrite the URLs of the webpage are hidden to the user. For example, the URL associated with the clicking of the OK button 506 has been rewritten.

The server 100 generates a recording interface 510 to be displayed on the user interface 500 during the testing. The recording interface 510 may generally include a recorded actions section 512 that details each recorded user action. As the webpage was just loaded in the example of FIG. 5, no user actions have yet to be detected by the inserted code and recorded. The recording interface 510 further includes a finish recording button 514. Upon selection of the button, the test of the webpage is completed, and the user may playback the test or save the test for playback at a further date. The recording interface 510 is shown in the upper left portion of the browser; in various embodiments, the recording interface 510 may be located in any position on the browser, may be any size or shape, and may be movable. Further, the recording interface 510 may include any number of controls for providing additional features (e.g., starting a recording, pausing a recording, deleting or adding user actions, etc.).

Figure 6:
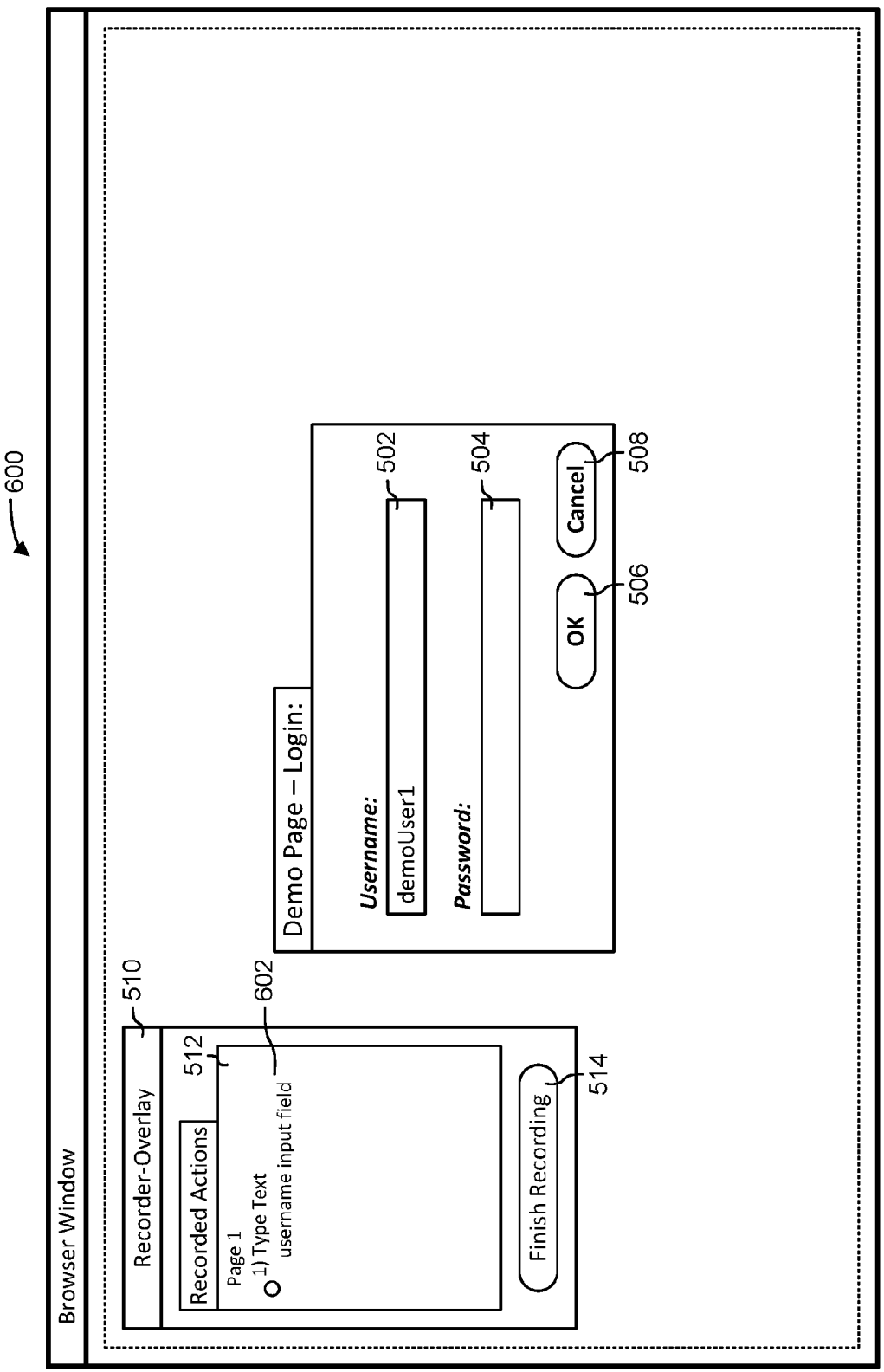
FIG. 6 is an example user interface, wherein the recording function has recorded a user action on the webpage during the webpage test according to various embodiments.
Figure 7:
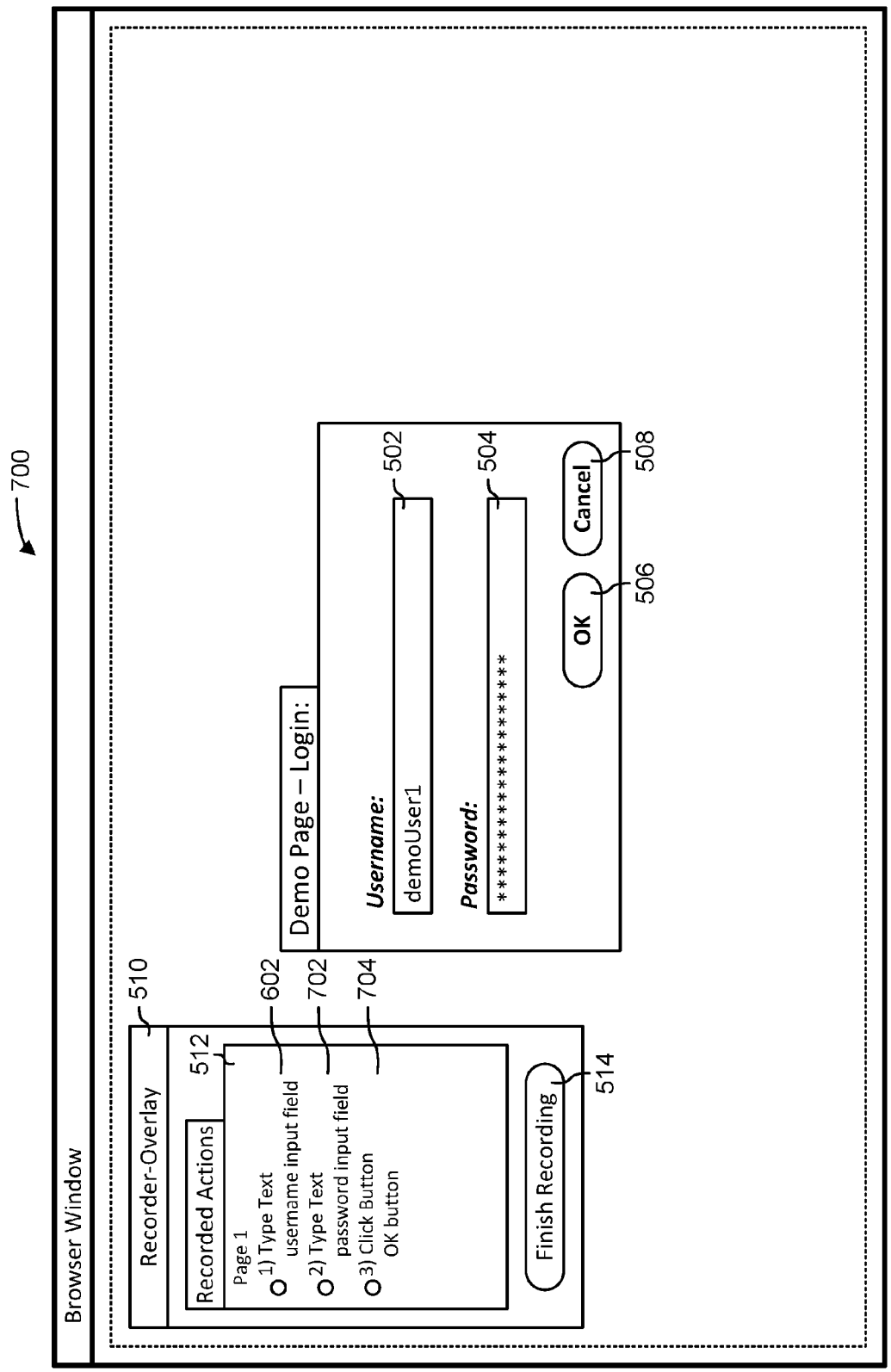
FIG. 7 is an example user interface, wherein the recording function has recorded multiple user actions on the webpage during the webpage test according to various embodiments.

At the user interface 600 of FIG. 6, the user has taken an action of typing in the username field 502. The recorded actions section 512 has therefore been updated with a new entry 602 detailing the user action. The details may generally include the type of action (e.g., "type text"), the location of the action (e.g., "username input field"), and/or a value or text that was entered. At the user interface 700 of FIG. 7, the user has taken two more actions of typing in the password field 504 and clicking the button 506. Two entries 702, 704 are shown to be added in the recorded actions section 512.

When the user selects the OK button 506, the webpage may be configured to take the user to a new webpage. As shown in the user interface 800 of FIG. 8, in this example, the webpage may include any number of webpage elements. As described above, when the OK button 506 is clicked, the request for the new webpage is sent to the server 100, and the server 100 rewrites the code of the webpage. For example, each URL shown in the new webpage was rewritten by the server 100. Again, the webpage looks exactly the same as it would if it was not being tested.

The recording interface 512, and more particularly its corresponding code, may be configured to detect various types of user actions. As one example, the code may detect any user interaction with an element, such as a click, double click, or right click on the element. The code may also detect a selection of a menu option. As another example, the code may simply detect the selection of the menu option, or may detect a click on a drop-down arrow that causes the presentation of multiple menu options in addition to the actual selection of a single menu option. As another example, the code may detect a text input in a text field, updating in real-time or near real-time.

Figure 8:
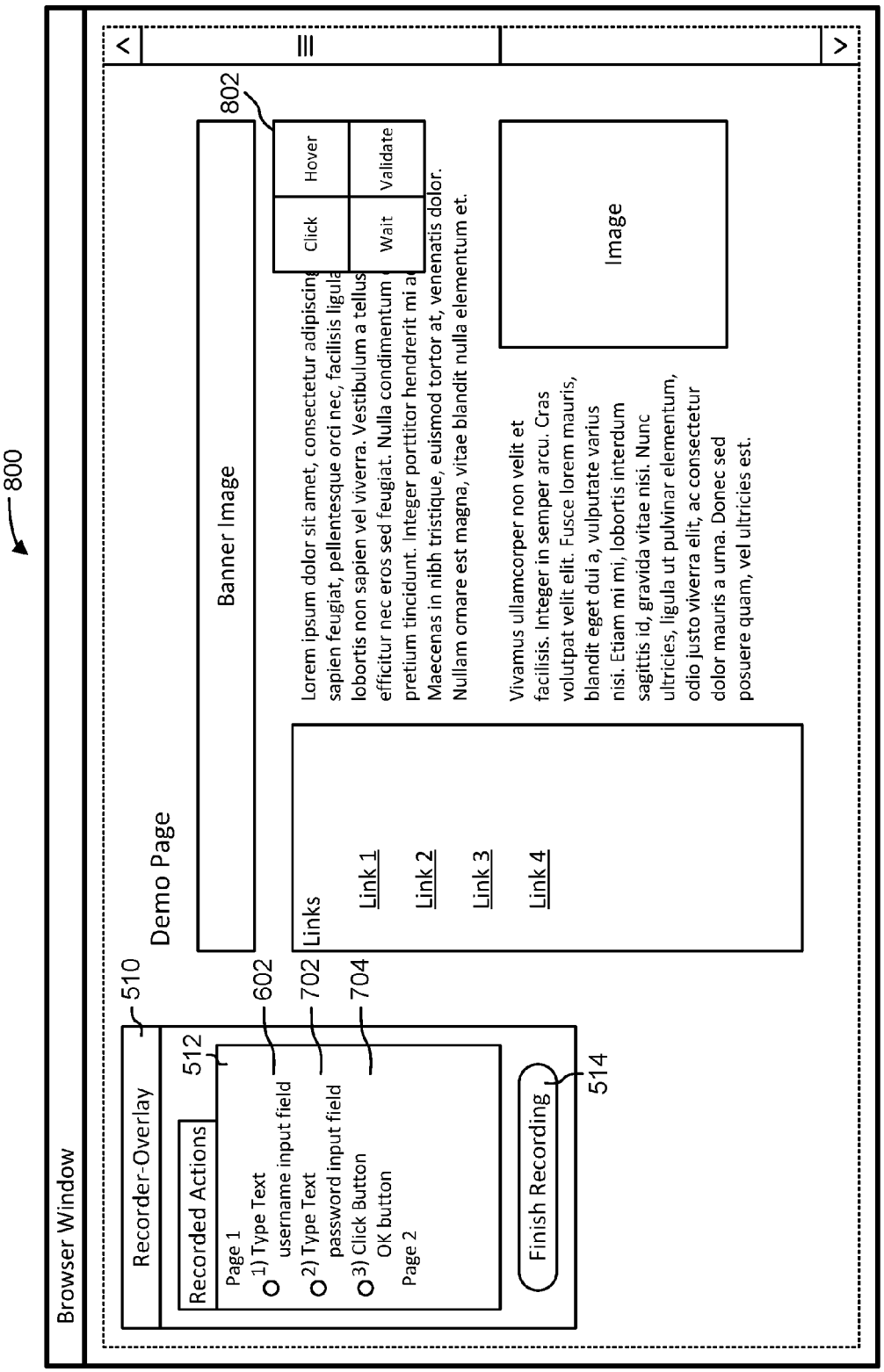
FIG. 8 is an example user interface, wherein the recording function has recorded multiple user actions across multiple webpages during the webpage test according to various embodiments.
Figure 9:
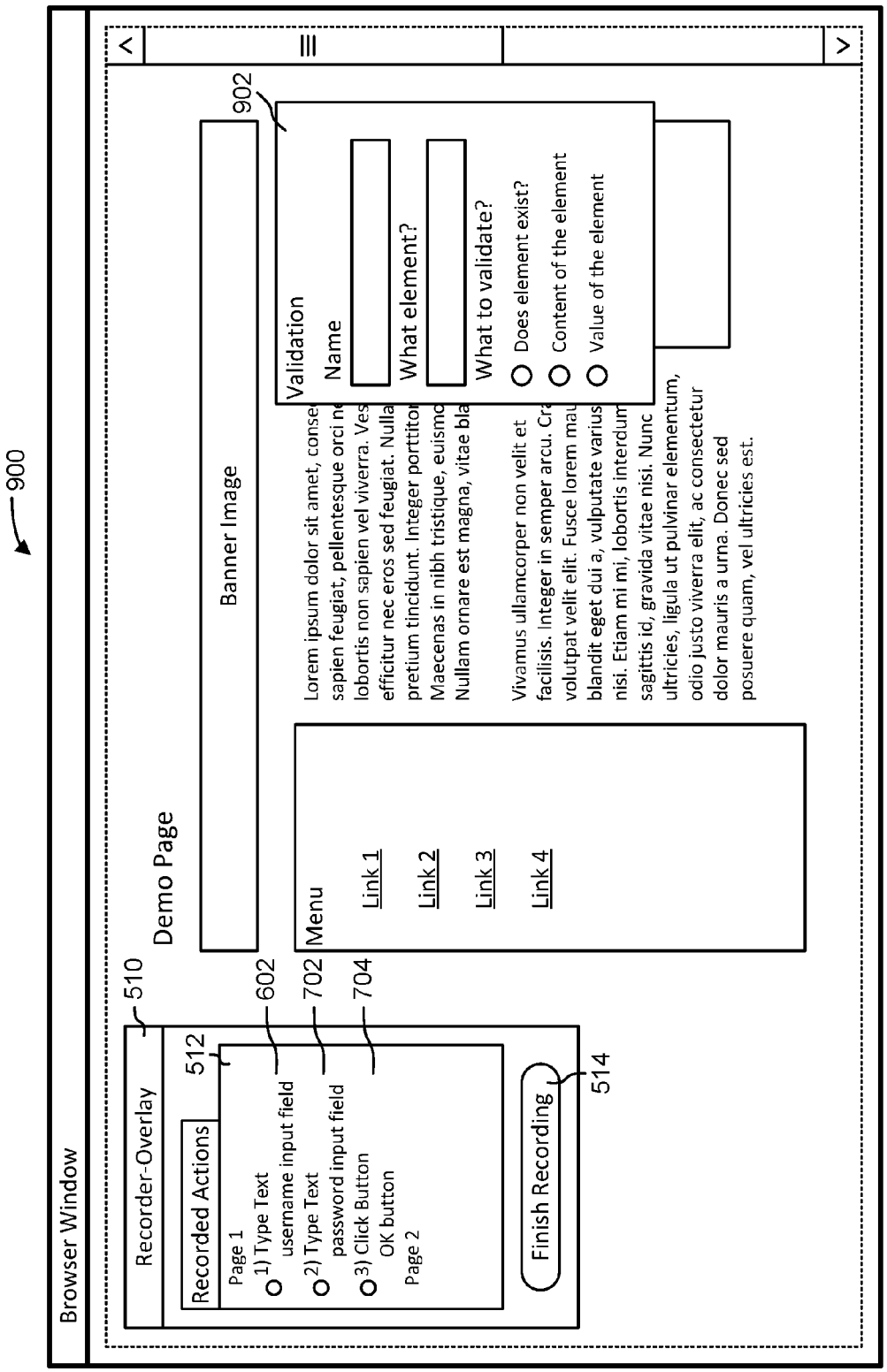
FIG. 9 is an example user interface, wherein a validation process during the recording is illustrated according to various embodiments.
Figure 10:
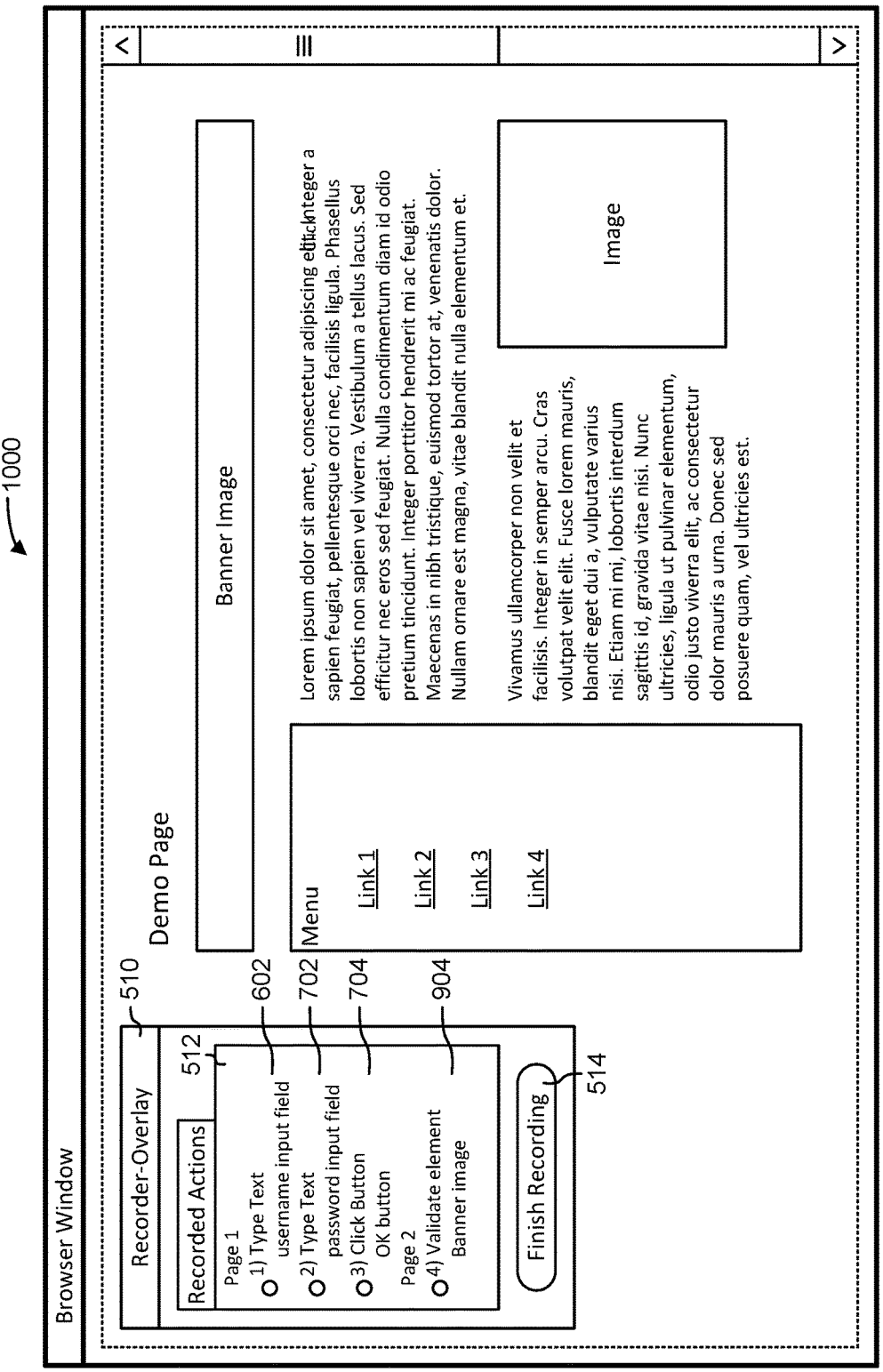
FIG. 10 is an example user interface, wherein a validation process during the recording is completed according to various embodiments.

In some embodiments, the user may wish to record a user action which may not be automatically detectable by the code. For example, a desired user action may be the mouse hovering over a particular webpage element, or waiting a specific amount of time while a webpage element plays back media. In such cases, the user may manually enter a user action. As shown in FIG. 8, the user may call up a menu 802 that allows the user to specify a user action to be entered to the recording interface 512. For example, the user may specify a hover event to add to the user actions, the hover event being a mouse hovering over a webpage element. As another example, the user may specify a wait event and more particularly an amount of time (e.g., 100 ms, 1000 ms, etc.) in which no user activity takes place on the webpage.

In one embodiment, the user may specify a validation event. For example, instead of actually taking an action, the user may simply wish to validate a particular webpage element. The validation may include ensuring that the webpage element is displayed properly, comparing a current state of the webpage element to a former state, checking whether the element has changed, and the like. As shown in the user interface 900 of FIG. 9, when selecting the validation option 902, the user can identify the element, name the element (for display in the recording interface) and specify what to validate (e.g., if the element exists, the content of the element, the value of the element, etc.). The element is then validated, and the validation is counted as a recorded action by the code. As shown in the user interface 1000 of FIG. 10, the validation action 904 is added to the list of recorded actions.

In one embodiment, the user may be able to select a user action in the recording interface 512 and may edit the entry. For example, the user may change a title or name field that identifies the user action (for easier identification of the user action later), may modify a value associated with the user action (e.g., changing the text to be typed in), or may add or remove user actions. In some embodiments, some or all of these editing features may or may not be implementable based on the type of user action and modification.

Referring back to FIG. 4, now assume that the user has selected a recording 412 for playback. During the playback, the server 100 and user device 150 causes the presentation of the user actions, one after another, on the browser. The look of the playback may be visually similar to how the webpage looked during the initial test that was saved. For example, in the user interface 500 of FIG. 5, first the rewritten webpage is loaded. The first user action is retrieved (typing in the username field in this example) and then played back on the browser for the user to see, resulting in the user interface 600 of FIG. 6. Again, as described above, the server 100 is configured to rewrite the webpages to be displayed during the playback, as the playback is occurring.

Figure 11:
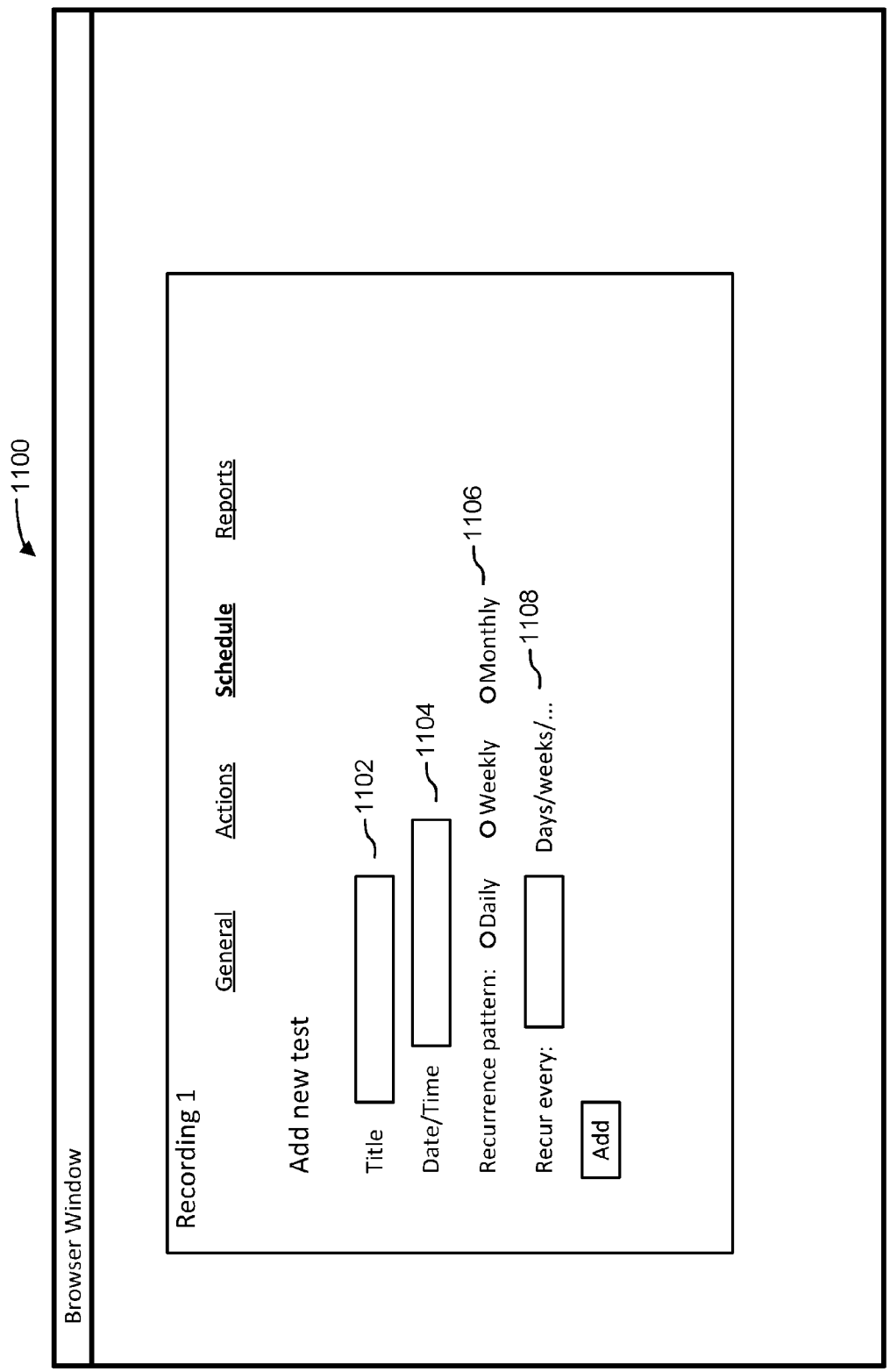
FIG. 11 is an example user interface, wherein the process of scheduling a webpage test is shown in greater detail according to various embodiments.

Referring to FIG. 11, various options for scheduling a playback is shown. After the user finishes a recording of a test, the user may be taken to a user interface 1100 to set up a schedule (and/or to a user interface to allow the user to save the test). The user may set a title 1102 for the playback, as well as a date and time 1104 to perform the playback. The playback may be a one-time playback, or the user may choose to execute the playback every day, week, month, etc. The user may select a recurrence pattern 1106 and a recurrence duration 1108 (e.g., executing the playback for the next ten weeks, five months, indefinitely, etc.). This playback may then be saved at the user device 150 or server 100, and the user device or server may automatically initiate the playback based on the schedule. In one embodiment, the start page (shown in FIG. 4) may display one or more scheduled playbacks from which the user may select a playback for editing, deleting, etc.

In one embodiment, the server 100 may be configured to support registration with the server. For example, a user may set up an account with the server such that the server can save one or more user preferences. The user may schedule a plurality of playbacks and tests with the server via the account. The server 100, in some embodiments, may be able to offer paid features and/or free features to the user.

The server 100 may be used to test the functionality of a webpage across many browsers. For example, some webpages may function properly in one type of browser, but not in another. A user may access a webpage associated with a server in several different browsers, and initiate the same test in each browser. Further, the user may access the same saved recording of a test in several different browsers on different devices and operating systems, therefore running the same test at the same time across different browsers. The user may also initiate an automated playback in different browsers or headless browsers located remotely. This may allow the user to see which browsers, which browser settings, which versions of browsers, etc. are having trouble displaying a webpage properly.

Figure 12:
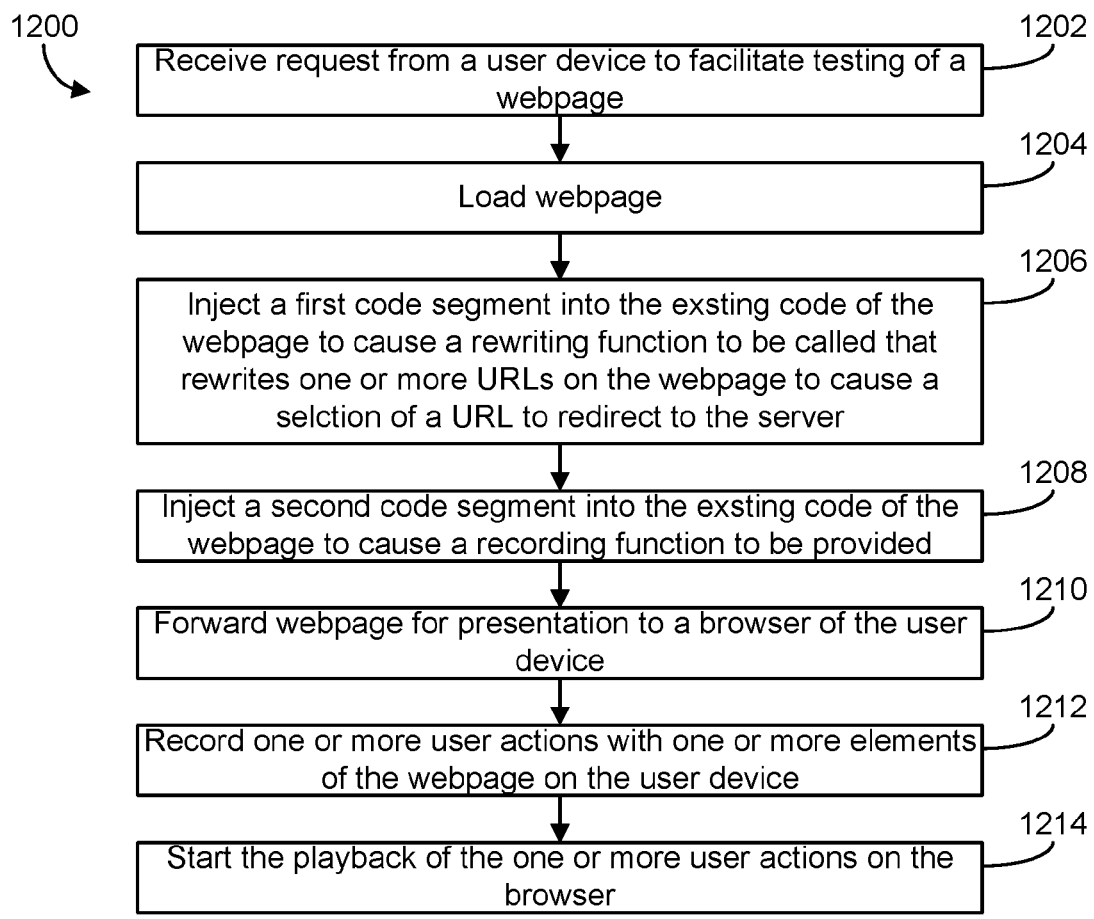
FIG. 12 is a flow chart of a web testing process according to various embodiments.

Referring now to FIG. 12, a flow chart of the web testing process 1200 of the present disclosure is shown according to various embodiments. The web testing process 1200 describes a process of executing a webpage test and the subsequent playback of the test at a later time.

The process 1200 includes receiving, by a server, a request from a user device in order to facilitate testing of a webpage (block 1202) and loading, at the server, the webpage (block 1204).

The process 1200 further includes rewriting, at the server, the source code of the webpage. The source code may be HTML code, JavaScript code, ECMAScript code, or any other type of code. The rewriting may generally include the insertion of code. For example, rewriting the source code generally includes injecting a first code segment into the existing code of the webpage, wherein the first code segment causes a rewriting function to be called, wherein the rewriting function rewrites one or more static URLs on the webpage such that a selection of a rewritten URL is redirected to the server (block 1206). Rewriting the source code generally further includes injecting a second code segment into the existing code of the webpage to cause a recording function to be provided on the webpage (block 1208). For example, a code shimming process can be used that includes intercepting a request related to a URL and modifying the URL in the source code of the webpage. In other words, before associating a URL with a particular webpage element, the code shimming process causes the URL to be modified such that selecting the URL causes a redirection to the server instead of the actual URL. The process 1200 further includes forwarding, at the server, the webpage with the rewritten source code for presentation to a browser of the user device (block 1210).

The process 1200 further includes recording, via the recording function, one or more user actions with one or more elements of the webpage on the user device (block 1212). User actions may include, for example, an individual click, a selection of a URL, a click on a link, a text input, a press of a button, a selection from a drop-down menu, a keyboard input, a mouse click, a mouse hover, a touchscreen input, a file upload, or a file download. The one or more elements on the webpage may include at least one of a text field, a link, an image, a button, a scroll bar, a video, a drop-down menu, or any combination thereof.

Recording one or more user actions generally includes generating, via injection of a code, an interface on the browser. This may be the code inserted at block 1208. The interface includes a plurality of controls for managing the recording of the one or more user actions. The code is configured to detect a user action with an element on the webpage. The user action is stored in the interface on the browser that is descriptive of the user interaction. The user may edit a user action or delete a user action, in one embodiment.

In some embodiments, the user action may include the selection of a URL (or any action that causes a need to load information from another source). Upon detection of such a user action, the one or more URLs impacted by the user action are identified, and a DNS wildcard host record is used to redirect the selection of the URL or the request to the server. The server rewrites the one or more URLs such that the one or more URLs are converted to their original form. Then the server loads at least one element from the one or more URLs, the at least one element identified by the user action.

In one embodiment, the interface may provide an option for validation of an element. A request for validation of an element may be triggered on the webpage and the result of the validation of the element may be provided for display on the interface. The validation request may include one of checking if the element exists, the content of the element, the value of the element, the value of the element's attributes, or the state of the element.

The process 1200 further includes starting, by the server based on input from the recording function, the playback of the one or more user actions on the browser (block 1214). Starting the playback includes: receiving one of a request for playback from the user device or a termination of a user action; receiving data relating to the one or more user actions recorded by the recording function; repeating the process of rewriting the source code of the webpage and forwarding the webpage with the rewritten source code for presentation on the browser; and causing the one or more user actions to be executed on the browser.

In one embodiment, the user actions and a URL of the webpage are saved at the server, and the saved user actions and URL accessible by a user via the user device at a later time in order to recreate the playback. In another embodiment, the user actions and URL of the webpage are saved locally at the user device, and are accessible by a user via the user device at a later time. In one embodiment, the server may save metadata, values entered by a user on the webpage, and URLs on the webpage such that the information is accessible at the later time for recreating the playback. In various embodiments, additional saved information may include the properties and attributes of one or more objects on the webpage, one or more pictures or images displayed on the webpage, page loading or reaction timing values, object screen sizes (e.g., a length and width, or total number of pixels), object sizes (e.g., the size of an uploaded file), item positions on the webpage, fonts used for the text displayed on the webpage, or the language of the webpage. In some embodiments, the server may retrieve the information again at the later time.

In one embodiment, a report is generated for the user based on the playback of the one or more user actions.

In one embodiment, the server may receive a user input relating to a scheduling of the playback at a future time. When the playback occurs at the future time, the server loads the webpage and causes the one or more user actions to be executed on the webpage. The server may then also generate a report for the user based on the playback. Scheduling the playback at the future time may include selecting a recurrence pattern for the playback, wherein the recurrence pattern is one of hourly, daily, weekly, monthly, yearly, or another time period, and a recurrence period for the playback, wherein the recurrence period specifies the cadence of the playback at the user device (e.g., how often the playback is to occur).

The order or sequence of any process or method steps may be varied or re-sequenced according to alternative embodiments. Other substitutions, modifications, changes and omissions may also be made in the design, operating conditions, and arrangement of the various exemplary embodiments without departing from the scope of the present invention.

The construction and arrangement of the elements as shown in the exemplary embodiments are illustrative only. Although embodiments of the present disclosure have been described in detail, those skilled in the art who review this disclosure will readily appreciate that many modifications are possible without materially departing from the novel teachings and advantages of the subject matter recited.

What is claimed is:

1. A method, comprising:
  receiving, by a server, a request from a user device in order to facilitate testing of a webpage;
  loading, by the server, the webpage;
  rewriting the source code of the webpage, comprising:
    injecting, by the server, a first code segment into the existing code of the webpage, wherein the first code segment causes a rewriting function to be called, wherein the rewriting function rewrites one or more static uniform resource locators (URLs) on the webpage such that a selection of a rewritten URL is redirected to the server; and
    injecting, by the server, a second code segment into the existing code of the webpage to cause a recording function to be provided on the webpage;
  forwarding, by the server, the webpage with the rewritten source code for presentation to a browser of the user device;
  recording, via the recording function, one or more user actions with one or more elements of the webpage on the user device; and
  starting, by the server based on input from the recording function, the playback of the one or more user actions in the browser on the user device,
  wherein the method further comprises:
    receiving, by the server, an input from the user device corresponding to a selection of the rewritten URL;
    loading, by the server, a second webpage corresponding to an original static URL of the rewritten URL;
    modifying the source code of the second webpage by rewriting one or more static URLs on the second webpage to redirect to the server; and
    forwarding the second webpage with the modified source code for presentation to a browser of the user device.

2. The method of claim 1, wherein at least one of the one or more user actions is an action that causes a redirection to a new webpage; and
  upon the occurrence of the redirection action, a DNS wildcard host record is used to redirect the request to the server.

3. The method of claim 2, wherein the action causing a redirection to a new webpage is a selection of a URL.

4. The method of claim 1, wherein at least one of the one or more user actions is an action that causes the loading of additional content on the webpage;
  wherein upon the occurrence of the action, a DNS wildcard host record is used to redirect the request to the server.

5. The method of claim 1, wherein the injection of the first code segment comprises a code shimming process, wherein the code shimming process comprises:
  intercepting a request related to a URL, wherein the request is generated by the webpage code; and
  modifying the URL in the source code of the webpage, wherein the URL is one of in the source code of the webpage or a dynamically created URL.

6. The method of claim 1, wherein the injection of the first code segment comprises calling a function that receives a URL and returns a variant of the URL.

7. The method of claim 1, wherein starting the playback of the one or more user actions in the browser on the user device comprises:
  receiving, by the server, one of a request for playback from the user device or a termination of a user action;
  receiving, by the server, data relating to the one or more user actions recorded by the recording function;
  repeating, by the server, the process of rewriting the source code of the webpage and forwarding, by the server, the webpage with the rewritten source code for presentation to the browser; and
  causing, by the server, the one or more user actions to be executed on the browser.

8. The method of claim 7, wherein the user actions and a URL of the webpage are saved at the server;
  wherein the saved user actions and URL accessible by a user via the user device at a later time in order to recreate the playback.

9. The method of claim 8, further comprising saving, by the server, at least one of metadata, values entered by a user on the webpage, URLs on the webpage, properties and attributes of objects, pictures, page loading or reaction timing values, object screen sizes, object sizes, item positions on the webpage, fonts, or the language of the webpage, at the server;
  wherein the saved information is accessible at the later time for recreating the playback.

10. The method of claim 7, further comprising generating, by the server, a report for the user based on the playback of the one or more user actions.

11. The method of claim 7, further comprising:
  receiving, by the server, a user input relating to a scheduling of the playback at a future time;
  wherein the playback occurs at the future time, wherein the server loads the webpage and causes the one or more user actions to be executed on the webpage in one of a browser on a user device or a headless browser running at the server;
  wherein one of the server and the frontend on the user device is configured to generate a report for the user based on the playback; and
  wherein scheduling the playback at the future time comprises:
    selecting, by the server, a recurrence pattern for the playback, wherein the recurrence pattern is one of hourly, daily, weekly, monthly, yearly, or another time period; and
    selecting, by the server, a recurrence period for the playback, wherein the recurrence period specifies the cadence of the playback at the user device.

12. The method of claim 1, wherein recording one or more user actions comprise:
generating, by the server via injection of a code, an interface on the browser comprising a plurality of controls for managing the recording of the one or more user actions;
detecting, by the server via the injected code, a user action with an element of the webpage; and
storing, by the server, a user action in the interface on the browser that is descriptive of the user action.

13. The method of claim 12, further comprising receiving, by the server, a user selection from the interface, wherein the user selection is one of a request to edit a user action or delete a user action.

14. The method of claim 12, wherein at least one of the one or more user actions is an action that causes a redirection to a new webpage and wherein upon the occurrence of the action, a DNS wildcard host record is used to redirect the request to the server;
wherein the method further comprises:
identifying, by the server, one or more URLs on the webpage impacted by the user action;
using, by the server, the DNS wildcard host record to redirect the selection of the URL to the server;
rewriting, by the server, the one or more URLs such that the one or more URLs are converted to their original form; and
loading, by the server, at least one element from the one or more URLs, wherein the at least one element is identified by the user action.

15. The method of claim 12, further comprising:
providing, by the server, an option on the interface for validation of an element;
triggering, by the server, the validation of an element on the webpage; and
providing, by the server for display on the interface, the result of the validation of the element;
wherein the validation comprises one of checking if the element exists, the content of the element, the value of the element, the values of the element's attributes, or the state of the element.

16. The method of claim 1, wherein the one or more user actions comprises at least one of an individual click, a selection of a URL, a click on a link, a text input, a press of a button, a selection from a drop-down menu, a keyboard input, a mouse click, a mouse hover, a touchscreen input, a file upload, or a file download.

17. The method of claim 1, wherein the one or more elements on the webpage comprises at least one of a text field, a link, an image, a button, a scroll bar, a video, a drop-down menu, or any combination thereof.

18. The method of claim 1, wherein the webpage comprises at least one of HTML code, JavaScript code, or ECMAScript code wherein the one or more code segments to be injected is HTML code, JavaScript code, or ECMAScript code.

19. The method of claim 1, wherein the playback comprises executing the one or more user actions.

* * * * *